(12) United States Patent
Kames

(10) Patent No.: US 7,887,619 B2
(45) Date of Patent: Feb. 15, 2011

(54) ADSORPTIVE FILTER MATERIAL

(75) Inventor: Jost Kames, Duernten (CH)

(73) Assignee: artemis control AG, Uster (CH)

( * ) Notice: Subject to any disclaimer, the term of this patent is extended or adjusted under 35 U.S.C. 154(b) by 213 days.

(21) Appl. No.: 12/373,767

(22) PCT Filed: Jul. 10, 2007

(86) PCT No.: PCT/EP2007/057035

§ 371 (c)(1),
(2), (4) Date: Jan. 14, 2009

(87) PCT Pub. No.: WO2008/009588

PCT Pub. Date: Jan. 24, 2008

(65) Prior Publication Data

US 2010/0005962 A1    Jan. 14, 2010

(30) Foreign Application Priority Data

Jul. 20, 2006   (DE) .................. 10 2006 033 541

(51) Int. Cl.
*B01D 53/02* (2006.01)

(52) U.S. Cl. ...................... 95/116; 95/128; 95/132; 95/135; 502/402

(58) Field of Classification Search .............. 95/116, 95/128, 132, 135; 502/402
See application file for complete search history.

(56) References Cited

U.S. PATENT DOCUMENTS

| 4,039,442 | A | * | 8/1977 | Kadlec et al. | ............ 210/673 |
| 4,202,737 | A | * | 5/1980 | Shimizu | ............ 210/664 |
| 4,409,105 | A | * | 10/1983 | Hayashi et al. | ............ 210/679 |
| 5,797,979 | A | | 8/1998 | Quinn | |
| 2005/0211625 | A1 | | 9/2005 | Tanahashi | |

FOREIGN PATENT DOCUMENTS

| DE | 19834311 | 2/2000 |
| EP | 0991470 | 4/2000 |
| WO | WO 01/70391 | 9/2001 |

* cited by examiner

*Primary Examiner*—Robert J Hill, Jr.
*Assistant Examiner*—Christopher P Jones
(74) *Attorney, Agent, or Firm*—Cohen Pontani Lieberman & Pavane LLP

(57) ABSTRACT

An adsorptive filter material for the adsorption of acids or acid forming substances from the air is presented, which comprises an ion exchange material. The ion exchange material comprises a strong alkaline anion exchange resin with a ratio of at least 60% in the hydrogencarbonate form and a cation exchange resin in the H form with a ratio of not more than 15%.

16 Claims, No Drawings

ADSORPTIVE FILTER MATERIAL

PRIORITY CLAIM

This is a U.S. national stage of application No. PCT/EP2007/057035, filed on Jul. 10, 2007. Priority is claimed on the following application: Country: Germany, Application No.: 10 2006 033 541.4, Filed: Jul. 20, 2006, the content of which is incorporated here by reference.

FIELD OF INVENTION

The current invention relates in general to a material with adsorbing characteristics. In particular, the invention relates to such a material for acids and acid forming substances. The invention furthermore refers to filter components produced from said material.

BACKGROUND OF THE INVENTION

The removal of undesired traces of acid or acid forming substances from the air is of central importance in many industrial applications as well as in applications in personal and object protection.

Acids or acid forming substances develop corrosive or other destructive effects on the surface of objects which could impair or permanently destroy the entire object.

An example of such an acid forming substance is sulphur dioxide which is generated by burning fossil fuels. The generated sulphur dioxide is subsequently released into the atmosphere where it mixes with fresh air and is then reintroduced into buildings in a diluted form as part of the fresh air supply.

On surfaces or in combination with moisture films, the sulphur dioxide transforms to sulphurous acid, later sulphuric acid. In combination with ammonia as an alkaline substance, salts are produced, which for example in the form of ammonium sulphate crystals on the surface of optical components, such as illumination masks in the semiconductor production, can result in significant interference during the production process.

Further examples of acids are hydrogen chloride (HCl) and hydrogen fluoride (HF) which attack both metallic and non-metallic surfaces. For example hydrogen fluoride HF attacks the glass fibre structures which are commonly used in cleanroom filter systems for particle filtration. Hydrogen fluoride partly reacts with the boric components of the glass fibres and creates boron tri-fluoride, which is a volatile component which can escape into the air and can result in undesired doping effects in silicon based semiconductor structures during manufacturing processes.

An example of damaged objects are, to name a few, metallic or semiconductor structures and substrate surfaces in semiconductor manufacturing and processing as well as the surfaces of objects with a mineral constitution such as marble or enamel as objects of common use or art.

A further area in which acids or acid forming substances can occur is the breathing air or breathing protection with respect to the inhalation of acidic, caustic gases, for example during a fire or disaster. A typical example is the release of hydrogen chloride HCl during the burning of chloride containing plastics such as polyvinylchloride (PVC).

A number of processes have been described for removing acids and acid forming substances from airstreams.

Most processes, according to the state of the art, rely on sorption materials that are based on unmodified or chemically modified carbon where the acidic gases are stored intermediately on the surface, and by means of chemical transformation, stable, non-volatile products should be produced.

A disadvantage of sorption on activated carbon is always that, in order to achieve reliable and efficient operation, a well controlled ratio of the surface deposit to the total pore volume at ideal temperature and humidity conditions must be carried out. In addition it is unavoidable in such activated carbon systems that, due to the pore structure, an undesired co-adsorption of organic, hydrophobicizing substances occurs which can not only limit the adsorption capability for acids but can completely prevent it which occurs frequently which deprives from a forecast and control of performance.

Another disadvantage of the sorption process on activated carbon is that this is a multi-step process comprising transport to the active carbon core, migration into the pores, intermediate storage and chemical reaction. Even though this process is thermodynamically supported by the enthalpy of the reaction, some steps along the chain can only occur very slowly due to the transport kinetics which consequently results in a relatively poor sorption performance.

It was also found that undesired and uncontrollable reactions can occur on the surface of the activated carbon which, by means of a surface reaction, changes a harmless or mildly active substance into a higher oxidized, corrosive substance. One example is the partial conversion of nitrogen dioxide $NO_2$ on the surface of activated carbon into nitrous acid $HNO_2$.

Patent EP 0 991 470 B1 discloses a filter for clean air for the cleaning of air streams of gaseous acidic substances, such as sulphur dioxide or ammonia, which comprises a highly air permeable, three dimensional carrier on which ion-exchange spheres are attached whereby the carrier is a large pored, reticulated polyolefin foam and the attachment of the ion-exchange spheres is achieved via heating. The ion-exchange spheres can either be strong alkaline anion exchange resins or strong acidic cation exchange resins.

Patent WO 01/70391 discloses a filter material with adsorbing characteristics comprising a carrier layer and a first layer of adsorbing material which is connected with the carrier layer. In addition, the filter material comprises a second or a second and a third adsorbing layer whereby all individual adsorbing layers form one total adsorbing layer. One or two of the adsorbing layers consist preferably of impregnated activated carbon material. Additionally, one or two of the adsorbing layers consist preferably of ion-exchange materials. The implementation of ion-exchange resins results in a very advantageous extension of the life times with high efficiency of the filter materials.

The disadvantages of the technologies described in this document result from the previously mentioned disadvantages of the activated carbon components within the material. Furthermore, it is known that slightly alkaline anion exchange resins exhibit poor performance in binding acid forming substances such as sulphur dioxide ($SO_2$). Strong alkaline OH-containing anion exchange resins show chemical and thermal instability since they continuously produce volatile amino compounds resulting from a continuous degradation process of the polymer structure.

The above described disadvantages bring about that the described materials are not suitable for the required wide-banded removal of acids and acid forming substances. A further disadvantage is the release of amino compounds which are very strong odorous substances which makes the implementation of the materials impossible in ventilation systems in residential buildings or production sites.

The release therefore prevents use of the described materials in the area of breathing protection as well as the area of semiconductor manufacturing where the release of compounds could result in process disruptions.

SUMMARY OF THE INVENTION

It is the objection of the present invention to provide a material that, due to fast transport mechanisms, binds acids and acid forming substances from the air with a high adsorption efficiency.

A further object of the present invention is to provide a material which complies with the current, stringent specifications for clean air.

These objects and further objects are solved by the filter material according to claim 1. Additional advantageous embodiments are described in the dependent claims.

DETAILED DESCRIPTION OF THE INVENTION

According to the invention, the filter material comprises at least 60% of a strong alkaline quaternary anion exchange resin which is especially produced in the hydro-carbonate form and not more than 15% of a cation exchange resin in the H-form.

These materials exhibit a high efficiency in the filtration of acids and acid forming substances without the disadvantages of releasing trace elements or the undesired formation of other substances.

In a preferred embodiment the material comprises a water content of 25% which is bound in the polymer matrix (ion exchange resin) whereby the described chemical sorption function can also be realized at a moisture content of 20% or 40%.

The materials of the ion exchanger described in the invention preferably comprise grain diameters of 0.5-0.8 mm, whereby materials with an average grain diameter of 0.5-0.6 mm are especially preferred.

An example according to the invention is a material that comprises a mixture of 68% anion exchange resin in the hydro-carbonate form, 17% anion exchange resin in the hydroxide form and 15% cation exchange resin in the H-form. The mixture exhibits a water content of 25%, based on the total weight of the ion exchanger, when implemented to examine its efficiency. The described material was completely odorless.

A material sample of 1 cm in height was analyzed in form of a precipitation test for sulphur dioxide in a test apparatus, for example a sorption column for the examination of the dynamic sorption capacity, i.e. flow conditions, with respect to the precipitation. For this analysis a mixture of 20 ppmv of sulphur dioxide in pure air at 50% relative humidity at 23° C. was directed through the material sample. The bed exchange rate was 122,000 exchanges per hour.

The precipitation capacity of the described material for sulphur dioxide was 92% and remained above 90% for more than 120 minutes.

Another material according to the invention was produced as a mixture of 89% anion exchange resin in the hydro-carbonate form as well as 11% cation exchange resin. The average water content of the polymer mixture was 26%, based on the total mass. The material sample was introduced into a sorption column with a height of 1 cm, flowed with test air at a velocity of 0.7 m/s, 23° C. and 50% relative humidity, while simultaneously adding 10 ppvm of sulphur dioxide into the test air. The initial degree of precipitation of this specific sample was larger than 95%.

In order to achieve the full performance, the materials according to the invention are preferably incorporated as supporting structures. These can be for example realized via reticulated open cell polymer foam on the basis of PE-PU or polyether, on which a thin adhesive film is attached.

An example of such a material according to the invention was produced by coating in a first step a 20 mm strong substrate of reticulated PE-polyurethane foam with a two component PU-reactive adhesive so that all bars on the surface and the depth of the materials were coated with an adhesive film. In a subsequent step the material, comprising a mixture of 68% anion exchange resin in the hydrogencarbonate form, 17% anion exchange resin in the hydroxide form and 15% cationic exchanger in the H-form, were sprinkled into the structure and were fixed in position by adhering to the PE-PU foam. After the curing phase of the adhesive and taking into account the remaining water content the foam substrate contained about 2,800 g/m$^2$ of the ion exchange mixture.

Said material underwent a performance test in a cleanroom environment.

A cassette-like formed filter component was placed on the inlet side of a filter ceiling. The resulting average air velocity through said component resulted in 1 m/s. During the test the precipitation capability for components in the unfiltered air was examined which showed the following average concentrations:

Sulphur dioxide: 0.5 ppbv, nitrogen oxide: 6.1 ppbv, hydrogen chloride: 0.2 ppbv.

For sulphur dioxide, a precipitation efficiency of more than 80% was found, for hydrogen chloride a precipitation performance of more than 75% was found whereas in nitrogen dioxide no statistically significant precipitation was found. The described test was carried out without any disturbance of the process by release of odor.

An additional preferred form of application is the incorporation of the filter material in a textile structure, for example located between the carrier and cover non-woven on a microscopic structure of interconnecting fibres.

In one example a mixture of the material according to the invention comprising 70% anion exchange resin in the hydrogencarbonate form, 17% anion exchange resin in the hydroxide form and 13% cation exchange resin in the H-form was produced in a percolated form with rest water content of 28%. This material was attached in a processing step in form of a 1.6 mm thick layer on to a textile substrate via extremely thin filaments of reactive adhesives within the layer and was permanently covered with an open fleece material.

The filter compound material produced in this manner, which exhibits a content of 540-560 g/m$^2$ of the mixed bed underwent a test for the precipitation capability for acid forming gases.

For this reason a mixture of 10 ppmv sulphur dioxide in pure air at 50% relative humidity and 23° C. with a velocity of 7 cm/s was passed through a material sample located in a test apparatus. Said material sample exhibited a precipitation capability of 93.5% which remained unchanged for 90 minutes.

In another experiment a mixture of 10 ppmv of nitrogen oxide in pure air at 50% relative humidity and 23° C. with a velocity of 7 cm/s was passed through a material sample located in a test apparatus. The material sample did not exhibit any precipitation capability for nitrogen oxide as well as no formation of nitric acid of nitrous acid was observed as well as nitrogen monoxide, which showed the desired behavior.

In another example a filter component suitable for application in clean room processes based on said filter compound material, with a content of 550+/−20 g/cm$^2$ of the mixed bed, was realized in form of pleated structure.

The exemplary described component comprised said material in form of a 60 mm high pleated package whereby the distance between the corners of the pleads was set to 9 mm via supporting tools.

The cassette like filter component was placed on the raw air side of a filter ceiling. The velocity of the air passing through the component resulted in a flow-through velocity of the mixed bed of 5 cm/s. In the current example the precipitation capability for components in unfiltered air was investigated that showed the following, average concentrations:

Sulphur dioxide 0.8 ppbv, nitrogen dioxide 5.2 ppbv, hydrogen chloride: 0.2 ppbv.

For sulphur dioxide a precipitation capability of more than 90% was found, for hydrogen chloride a precipitation capability of more than 85% was found, whereas for nitrogen dioxide no statistically significant precipitation was found. The described test was carried out without any disturbance of the process by release of odor.

In another example a mixture of the material according to the invention comprising 75% anion exchange resin in the hydrogencarbonate form, 10% anion exchange resin in the hydroxide form and 15% cation exchange resin in the H-form was produced in a percolated form with rest water content of 25%. Adhesive dots of a PU reactive hot-melt adhesive were printed via a textile printing process onto an open meshed, fixated textile (supporting net) with rectangular openings of about 2 mm. Directly afterwards a mixture according to the invention was deposited, whereby the sorbent particles were affixed in form of a monolayer at the location of said adhesive dots. The resulting, extremely air permeable areal structure showed a sorbent charge of $250\pm30$ g/m$^2$ at a thickness of 1.2 mm. Three test samples with a diameter of 105 mm diameter were stamped out of the material and three layers were placed on top of each other and clamped in a test apparatus. The performance test was carried out with a mixture of 5 ppmv sulphur dioxide in air with a flow through velocity of 2 cm/s, whereby the air was at 23° C. and at a 50% relative humidity. The precipitation capability for sulphur dioxide was 97%.

The invention claimed is:

1. Adsorptive filter material for the adsorption of acids and acid-forming substances from the air, comprising an ion exchange material comprising
    a) an amount of at least 60% of a strong alkaline ion exchange resin in the hydrogencarbonate form; and
    b) an amount of not more than 15% of a cation exchange resin in the H-Form.

2. Adsorptive filter material according to claim 1, characterized in that the ion exchange material additionally contains an amount of less than 20% of the exchange resin in the hydroxide form.

3. Filter material according to claim 1, characterized in that the filter material exhibits a water content of 20-40% bound in a polymer matrix.

4. Filter material according to claim 3, characterized in that the filter material exhibits a water content of 25% bound in a polymer matrix.

5. Filter material according to claim 1, characterized in that the ion exchange material is present in spherical or fiber form.

6. Filter material according to claim 5, characterized in that the spheres exhibit an average diameter of 0.5-0.8 mm.

7. Filter material according to claim 6, characterized in that the spheres exhibit an average diamteter of 0.5-0.6 mm.

8. Filter material according to claim 1, characterized in that the ion exchange material comprises
    a) 68% of a strong alkaline anion exchange resin in the hydrocarbonate form;
    b) 17% of a strong alkaline anion exchange resin in the hydroxide form; and
    c) 15% of a cation exchange resin in the H-form; and
    in that the filter material comprises a water content of 25% based on the total weight of the filter material.

9. Filter material according to claim 1, characterized in that the filter material is incorporated into a supporting structure.

10. Filter material according to claim 9, characterized in that the supporting structure is a reticulated open cell polymer foam.

11. Filter material according to claim 9, characterized in that the filter material is affixed between an air permeable carrier non-woven and an air permeable cover non-woven.

12. Filter material according to claim 9, characterized in that the filter material is applied two-dimensionally on one side or on both sides of a support net.

13. Filter material according to claim 12, characterized in that the support net is an open meshed net having openings of about 2 mm.

14. Process for the fabrication of an adsorption filter comprising the filter material according to claim 1 characterized by the following steps:
    a) wetting a reticulated polyurethane foam with a two-component reactive adhesive; and
    b) applying the filter material on to the foam structure.

15. Filter body, comprising the filter material according to claim 1.

16. A method of cleansing an air stream comprising contacting the air stream with the filter body according to claim 15.

* * * * *